United States Patent
Huang

(10) Patent No.: US 9,148,574 B2
(45) Date of Patent: Sep. 29, 2015

(54) IMAGE-CAPTURE DEVICE AND IMAGE-CAPTURE METHOD CAPABLE OF ADJUSTING LIGHT METERING VALUE ACCORDING TO SELECTION SIGNALS THEREOF

(71) Applicant: WISTRON CORP., New Taipei (TW)

(72) Inventor: Tsung-Shang Huang, New Taipei (TW)

(73) Assignee: Wistron Corp., New Taipei (TW)

( * ) Notice: Subject to any disclaimer, the term of this patent is extended or adjusted under 35 U.S.C. 154(b) by 45 days.

(21) Appl. No.: 14/018,353

(22) Filed: Sep. 4, 2013

(65) Prior Publication Data

US 2014/0125845 A1 May 8, 2014

(30) Foreign Application Priority Data

Nov. 2, 2012 (TW) .............................. 101140701 A

(51) Int. Cl.
*H04N 5/335* (2011.01)
*H04N 5/232* (2006.01)
*H04N 5/235* (2006.01)

(52) U.S. Cl.
CPC ......... *H04N 5/23293* (2013.01); *H04N 5/2351* (2013.01)

(58) Field of Classification Search
CPC ........................ H04N 5/23216; H04N 1/00411
USPC ................................ 348/229.1, 230.1, 333.12
See application file for complete search history.

(56) References Cited

U.S. PATENT DOCUMENTS

| | | | | |
|---|---|---|---|---|
| 6,919,927 B1* | 7/2005 | Hyodo | ..................... | 348/333.02 |
| 7,034,881 B1* | 4/2006 | Hyodo et al. | ............. | 348/333.12 |
| 8,077,249 B2* | 12/2011 | Huang | .......................... | 348/345 |
| 8,416,306 B2* | 4/2013 | Yun et al. | .................. | 348/208.12 |
| 8,760,534 B2* | 6/2014 | Imamura | .................... | 348/222.1 |
| 2009/0256947 A1* | 10/2009 | Ciurea et al. | ............. | 348/333.12 |
| 2011/0115925 A1* | 5/2011 | Oh | .......................... | 348/207.99 |

* cited by examiner

*Primary Examiner* — Twyler Haskins
*Assistant Examiner* — Dwight C Tejano

(57) ABSTRACT

The present invention provides an image-capture device including an image-capture module, a display device, an input device, and a processing unit. The image-capture module is arranged to capture a preview image. The display device is arranged to display the preview image. The input device is arranged to receive at least one first selection signal and at least one second selection signal, wherein the first selection signal corresponds to a first area of the preview image, and the second selection signal corresponds to a second area of the preview image. The processing unit is arranged to calculate a light-metering value according to the first selection signal and the second selection signal, and force the image-capture module to capture an image according to the light-metering value.

8 Claims, 4 Drawing Sheets

IMAGE-CAPTURE DEVICE AND IMAGE-CAPTURE METHOD CAPABLE OF ADJUSTING LIGHT METERING VALUE ACCORDING TO SELECTION SIGNALS THEREOF

CROSS REFERENCE TO RELATED APPLICATIONS

This Application claims priority of Taiwan Patent Application No. 101140701, filed on Nov. 2, 2012, the entirety of which is incorporated by reference herein.

BACKGROUND OF THE INVENTION

1. Field of the Invention

The present invention relates to an image-capture device, and in particular to an image-capture device arranged to measure light according to weight values.

2. Description of the Related Art

Presently, mobile devices are highly developed and multifunctional. For example, handheld devices, such as mobile phones or tablets, are capable of telecommunications, receiving/transmitting e-mails, maintaining social networks, managing contacts, playing media, and photographing, etc.

However, the light-metering function of photographic applications can only measure light at a single point, or measure the average light in the complete image. Namely, the common light-metering function can not measure light according to the needs of the users. Therefore, it causes an inconvenience for users of the photographic applications.

BRIEF SUMMARY OF THE INVENTION

A detailed description is given in the following embodiments with reference to the accompanying drawings.

The image-capture device and the image-capture method of the present invention can calculate a light-metering value according to the weight values corresponding to different areas in the image and capture an image according to the light-metering value.

The present invention discloses an image-capture device. The image-capture device includes an image-capture module, a display device, an input device, and a processing unit. The image-capture module is arranged to capture a preview image. The display device is arranged to display the preview image. The input device is arranged to receive at least one first selection signal and at least one second selection signal, wherein the first selection signal corresponds to a first area in the preview image, and the second selection signal corresponds to a second area in the preview image. The processing unit is arranged to calculate a light-metering value according to the first selection signal and the second selection signal, and enable the image-capture module to capture an image according to the light-metering value, wherein the processing unit further includes a first calculation module and a second calculation module. The first calculation module is arranged to calculate a first light-metering sub-value of the first area and a second light-metering sub-value of the second area. The second calculation module is arranged to produce a light-metering value according to the first light-metering sub-value and the second light-metering sub-value.

Additionally, the present invention further discloses an image-capture method. The image-capture method includes: capturing a preview image; displaying the preview image; receiving at least one first selection signal and at least one second selection signal, wherein the first selection signal corresponds to a first area in the preview image, and the second selection signal corresponds to a second area in the preview image; calculating a first light-metering sub-value of the first area and a second light-metering sub-value of the second area according to the first selection signal and the second selection signal, and producing a light-metering value according to the first light-metering sub-value and the second light-metering sub-value; and capturing an image according to the light-metering value.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
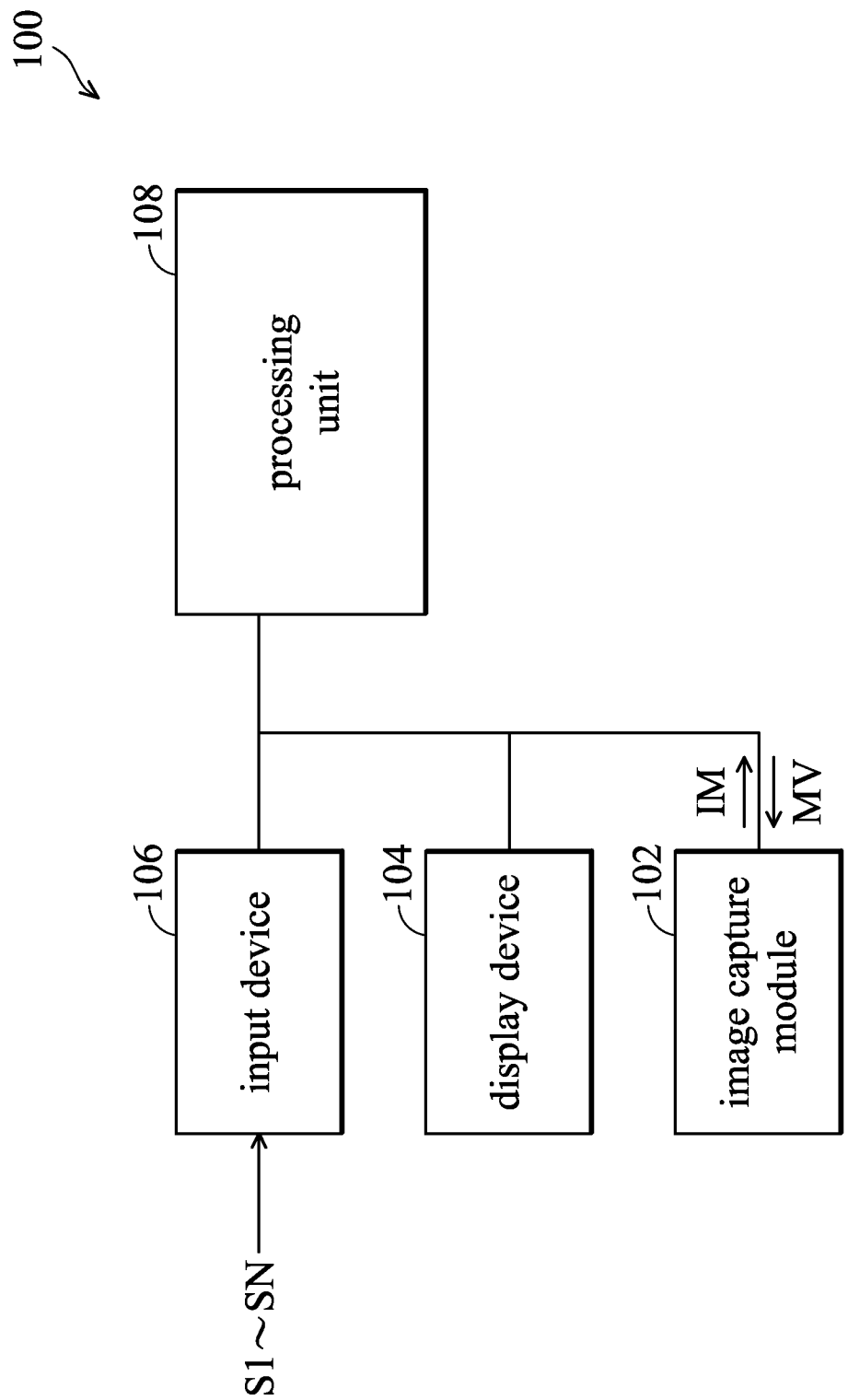
FIG. 1 is a schematic diagram illustrating an embodiment of an image-capture device of the present invention.

FIG. 1 is a schematic diagram illustrating an embodiment of an image-capture device of the present invention. The image-capture device 100 includes an image-capture module 102, a display device 104, an input device 106 and a processing unit 108. In some embodiments, the image-capture device 100 is a digital camera or a video camera. The image-capture device 100 can be implemented in a computer configuration, such as a handheld device, a multi-processor system, a microprocessor-based or programmable consumer electronic device, a mini computer, or a tablet PC, but it is not limited thereto.

The image-capture module 102 is arranged to capture a preview image IM and transmit the preview image IM to the display device 104 and the processing unit 108. It should be noted that the image-capture module 102 can further include a photosensitive element, an aperture and/or a shutter, etc., but it is not limited thereto. The display device 104 is arranged to display the preview image IM. The input device 106 is arranged to receive at least one of a plurality of selection signals S1-SN corresponding to a plurality of areas in the preview image IM, respectively. Namely, the input device 106 is arranged to receive at least one selection signal S1 corresponding to a first area in the preview image IM, at least one selection signal S2 corresponding to a second area in the preview image IM, a selection signal S3 corresponding to a third area in the preview image IM, and so on. For example, the processing unit 108 can divide the preview image IM into 144 areas, wherein each of the areas has a corresponding selection signal S1-S144, but it is not limited thereto. The processing unit 108 is further arranged to calculate a light-metering value MV according to at least one of the received selection signals S1-SN, and enable the image-capture module 102 to capture an image according to the light-metering value MV. It should be noted that the processing unit 108 may include a central-processing unit (CPU), a graphics processing unit (GPU), or a plurality of parallel processing units related in a parallel processing environment. Moreover, the image-capture module 102 can further include a memory device (not shown). The memory device can include a read only memory (ROM), a flash ROM and/or a random access memory (RAM), arranged to store the programs used for executing by the processing unit 108. Generally, the program includes routines, program codes, objects, components, or Web Service, etc.

Figure 2:
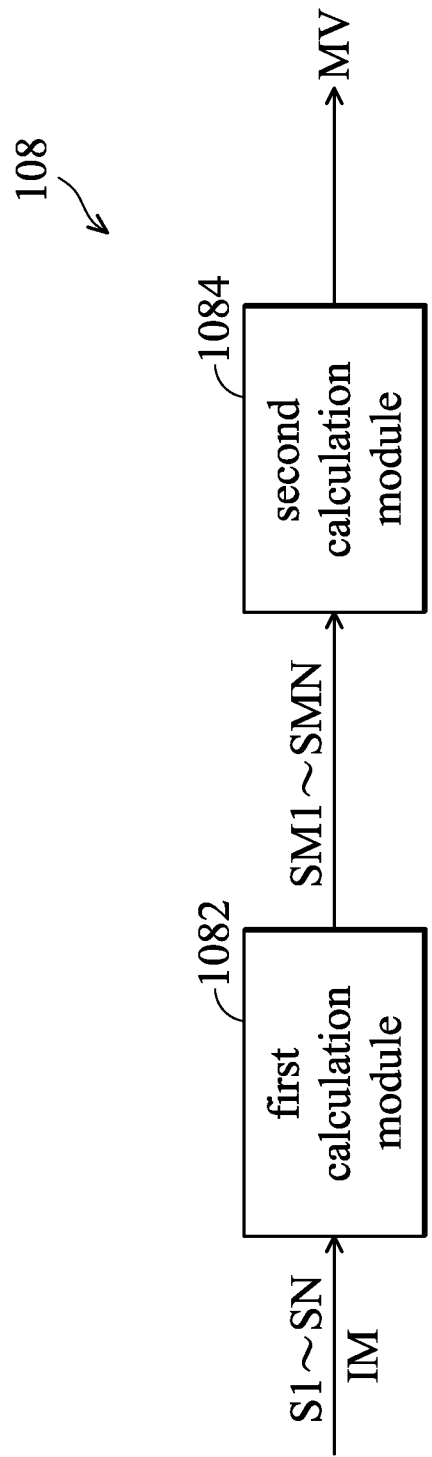
FIG. 2 is a schematic diagram illustrating an embodiment of a processing unit of the present invention.

FIG. 2 is a schematic diagram illustrating an embodiment of a processing unit of the present invention. In one of the present embodiments, the processing unit 108 further includes a first calculation module 1082 and a second calculation module 1084. The first calculation module 1082 is arranged to calculate a plurality of light-metering sub-values SM1-SMN corresponding to the areas in the preview image IM. The second calculation module 1084 is arranged to produce the light-metering value MV according to the light-metering sub-values SM1-SMN. In the following discussion, the description is based on the first area and the second area of the preview image IM, but it is not limited thereto. When the input device 106 has received a first selection signal S1 and a second selection signal S2 of the selection signals S1-SN, the input device 106 transmits the first selection signal S1 and the second selection signal S2 to the processing unit 108, wherein the first selection signal S1 corresponds to a first area of the preview image IM, and the second selection signal S2 corresponds to a second area of the preview image IM. The first calculation module 1082 of the processing unit 108 is arranged to calculate a first light-metering sub-value SM1 and a second light-metering sub-value SM2 according to the image data of the first area corresponding to the first selection signal S1 and the image data of the second area corresponding to the second selection signal S2, respectively. Moreover, the first calculation module 1082 is further arranged to transmit the first light-metering sub-value SM1 and the second light-metering sub-value SM2 to the second calculation module 1084. The second calculation module 1084 is arranged to produce the light-metering value MV according to the first light-metering sub-value SM1 and the second light-metering sub-value SM2. For example, when the input device 106 has received a first selection signal S1 and a second selection signal S2 of the selection signals S1-SN, the first calculation module 1082 calculates the first light-metering sub-value SM1 according to the grayscale values of the image corresponding to the first area in the preview image IM, and calculates the second light-metering sub-value SM2 according to the grayscale values of the image corresponding to the second area in the preview image IM. The second calculation module 1084 is arranged to produce a light-metering value MV by averaging the first light-metering sub-value SM1 and the second light-metering sub-value SM2, but it is not limited thereto.

In another embodiment, when the input device 106 has received a first selection signal S1, a second selection signal S2 and a third selection signal S3 of the selection signals S1-SN, the first calculation module 1082 is arranged to produce a first light-metering sub-value SM1, a second light-metering sub-value SM2, and a third light-metering sub-value SM3 according to the grayscale values of the image corresponding to the first area in the preview image IM, the grayscale values of the image corresponding to the second area in the preview image IM and the grayscale values of the image corresponding to the third area in the preview image IM, respectively. Moreover, the first calculation module 1082 is further arranged to transmit the first light-metering sub-value SM1, the second light-metering sub-value SM2, and the third light-metering sub-value SM3 to the second calculation module 1084. The second calculation module 1084 is arranged to calculate the average of the first light-metering sub-value SM1, the second light-metering sub-value SM2, and the third light-metering sub-value SM3 to obtain the light-metering value MV. In other embodiments of the present invention, the first calculation module 1082 may calculate a plurality of light-metering sub-values of the areas corresponding to the selection signals by the brightness or other data of the image of the area, but it is not limited thereto.

Figure 3:
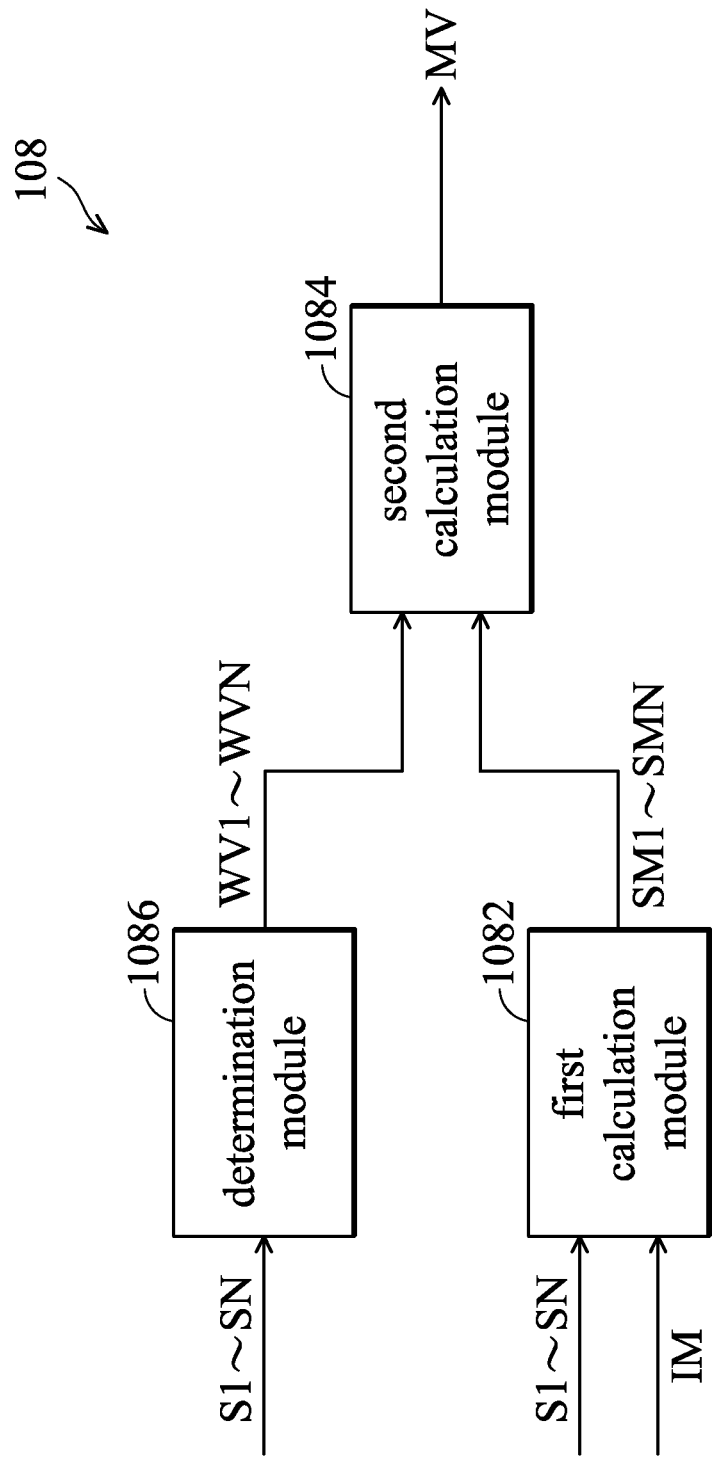
FIG. 3 is a schematic diagram illustrating another embodiment of a processing unit of the present invention.

FIG. 3 is a schematic diagram illustrating another embodiment of a processing unit of the present invention. In another embodiment of the present invention, the processing unit 108 further includes a first calculation module 1082, a second calculation module 1084 and a determination module 1086. The first calculation module 1082 is arranged to calculate a plurality of light-metering sub-values SM1-SMN corresponding to the areas in the preview image IM. The determination module 1086 is arranged to determine the weight values WV1-WVN corresponding to the received selection signals S1-SN according to the period or the number of times the selection signals S1-SN are received, respectively. The second calculation module 1084 is arranged to produce the light-metering value MV by weighting the light-metering sub-values SM1-SMN according to the weight values WV1-WVN. For example, each of the first selection signal S1 and the second selection signal S2 includes a first weight value WV1 and a second weight value WV2, respectively. In the following discussion, the description is discussed based on the first area and the second area of the preview image IM, but it is not limited thereto. When the input device 106 has received at least one first selection signal S1 and at least one second selection signal S2 of the selection signals S1-SN, the input device 106 transmits the first selection signal(s) S1 and the second selection signal(s) S2 to the processing unit 108, wherein the first selection signal(s) S1 correspond(s) to a first area of the preview image IM, and the second selection signal(s) S2 correspond(s) to a second area of the preview image IM. The first calculation module 1082 of the processing unit 108 is arranged to calculate a first light-metering sub-value SM1 and a second light-metering sub-value SM2 according to the image data of the first area corresponding to the first selection signal S1 and the image data of the second area corresponding to the second selection signal S2, respectively. Moreover, the first calculation module 1082 is further arranged to transmit the first light-metering sub-value SM1 and the second light-metering sub-value SM2 to the second calculation module 1084. The second calculation module 1084 is arranged to produce the light-metering value MV by weighting the first light-metering sub-value SM1 according to the first weight value WV1 and weighting the second light-metering sub-value SM2 according to the second weight value WV2.

In one of the embodiments of the present invention, the input device 106 can be implemented in a touch module of the display device 104. The determination module 1086 is arranged to determine the first weight value WV1 and the second weight value WN2 according to the length of the first selection signal S1 and the second selection signal S2. Namely, the determination module 1086 is arranged to determine the first weight value WV1 and the second weight value WN2 according to the length (period) of the first selection signal S1 and the period of the second selection signal S2. For example, when the user wants to measure light based on the image of the first area and the second area, the user may touch the first area and the second area on the touch module. When the period of the user touching the first area is three times longer than the period of the user touching the second area, the first weight value WV1 is 3 and the second weight value WV2 is 1, but it is not limited thereto.

In another embodiment of the present invention, the determination module 1086 is arranged to determine the first weight value WV1 and the second weight value WV2 according to the number of times the first selection signal S1 and the number of times the second selection signal S2 are received, respectively. For example, when the user wants to measure lights based on the image of the first area and the second area, the user may touch the first area and the second area on the touch module. When the user touches the first area 3 times and touches the second area one time, the first weight value WV1 is 3 and the second weight value WV2 is 1, but it is not limited thereto.

In another embodiment of the present invention, the input device 106 has a plurality of buttons. For example, the buttons can be a plurality of arrow keys and a selection key. The arrow keys are arranged to control the position of the cursor displayed on the preview image IM. The selection key is arrange to input the first selection signal S1 or the second selection signal S2 corresponding to the positions of the cursor. The determination module 1086 is arranged to determine the first weight value WV1 and the second weight value WV2 according to the length (period) of the first selection signal S1 and the second selection signal S2. For example, when the user wants to measure lights based on the image of the first area and the second area, the user may control the arrow keys and the selection keys to choose the first area and the second area, respectively. When the period of the user pressing the selection button on the first area is three times longer than the period of the user pressing the selection button on the second area, the first weight value WV1 is 3 and the second weight value WV2 is 1, but it is not limited thereto.

In another embodiment of the present invention, the determination module 1086 is arranged to determine the first weight value WV1 and the second weight value WV2 according to the number of times the first selection signal S1 and the number of times the second selection signal S2 are received, respectively. For example, when the user wants to meter lights based on the image of the first area and the second area, the user may control the arrow keys and the selection key to choose the first area and the second area, respectively. When the user presses the selection key three times when the cursor displayed on the first area and presses the selection key one time when the cursor displayed on the second area, the first weight value WV1 is 3 and the second weight value WV2 is 1, but it is not limited thereto.

Figure 4:
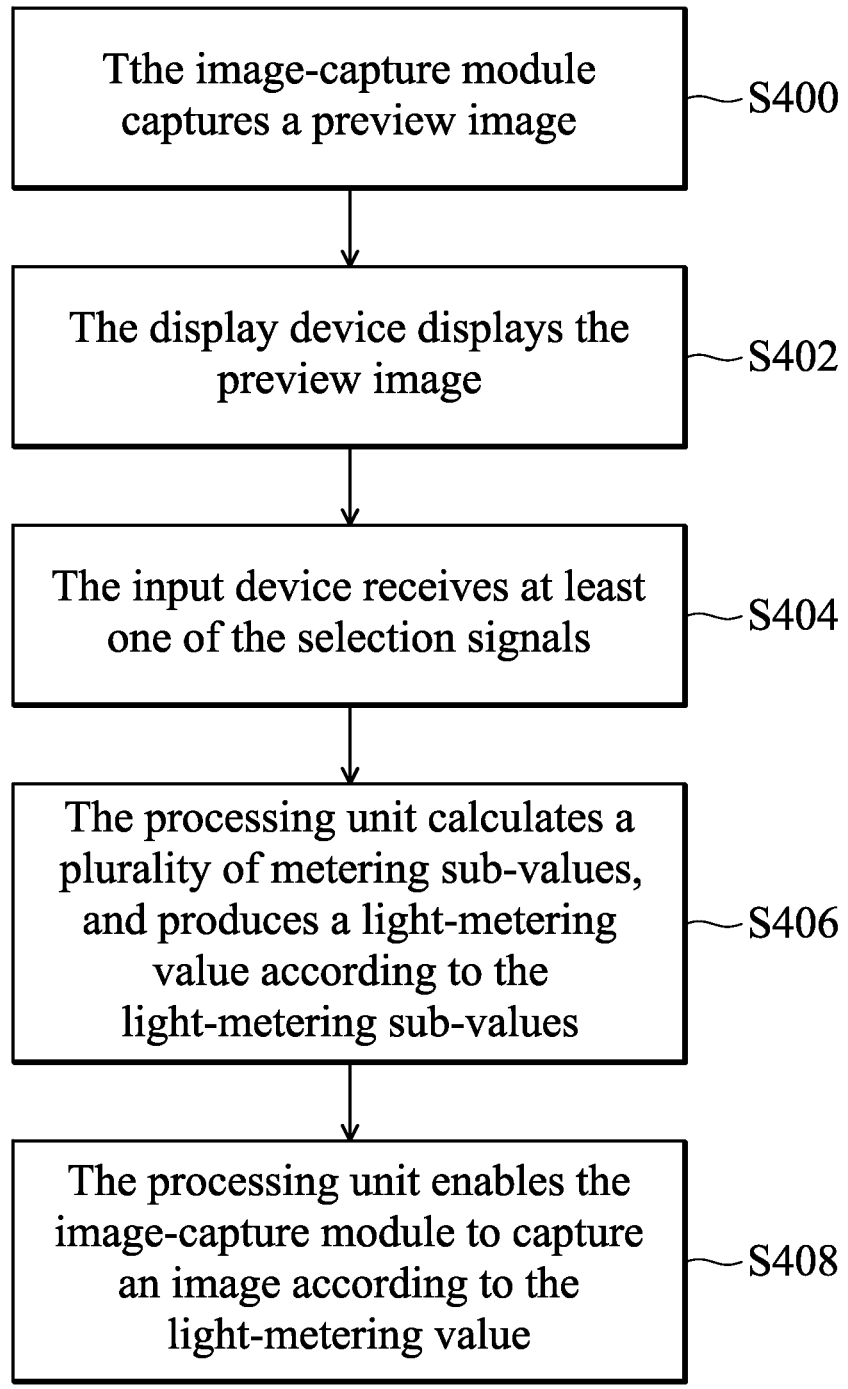
FIG. 4 is a flowchart of an image-capture method according to an embodiment of the present invention.

FIG. 4 is a flowchart of an image-capture method according to an embodiment of the present invention, wherein the image-capture method is applied to the image-capture device 100 of FIG. 1. The process starts at step S400.

In step S400, the image-capture module 102 is arranged to capture a preview image IM and transmit the preview image IM to the display device 104 and the processing unit 108.

Next, in step S402, the display device 104 is arranged to display the preview image IM.

Next, in step S404, the input device 106 is arranged to receive at least one of the selection signals S1-SN corresponding to the areas in the preview image IM. Namely, the input device 106 is arranged to receive at least one selection signal S1, at least one selection signal S2, at least one selection signal S3, and so on. For example, the processing unit 108 can divide the preview image IM into 144 areas, 1440 areas, 2000 areas, etc., and each of the areas has a corresponding selection signal, but it is not limited thereto.

Next, in step S406, the processing unit 108 is further arranged to calculate a plurality of metering sub-values SM1-SMN of the areas corresponding to the received selection signals S1-SN, and produce a light-metering value MV according to the light-metering sub-values SM1-SMN. Reference may be made to FIG. 1-FIG. 3 for a detailed description.

Next, in step S408, the processing unit 108 enables the image-capture module 102 to capture an image according to the light-metering value. The process ends at step S408.

The image-capture device 100 and the image-capture method of the present invention can calculate the light-metering value MV according to the weight values of the different areas, and capture an image according to the light-metering value MV.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image-capture device, comprising:
   an image-capture module, arranged to capture a preview image;
   a display device, arranged to display the preview image;
   an input device, arranged to receive at least one first selection signal and at least one second selection signal, wherein the first selection signal corresponds to a first area in the preview image, and the second selection signal corresponds to a second area in the preview image; and
   a processing unit, arranged to calculate a light-metering value according to the first selection signal and the second selection signal, and enable the image-capture module to capture an image according to the light-metering value, wherein the processing unit further comprises:
   a first calculation module, arranged to calculate a first light-metering sub-value of the first area and a second light-metering sub-value of the second area;
   a second calculation module, arranged to produce the light-metering value by respectively weighting the first light-metering sub-value and the second light-metering sub-value according to a first weight value and a second weight value; and
   a determination module arranged to determine the first weight value and the second weight value according to a period of the first selection signal and a period of the second selection signal, respectively.

2. The image-capture device as claimed in claim 1, wherein the input device is a touch module implemented in the display device.

3. An image-capture device, comprising:
an image-capture module, arranged to capture a preview image;
a display device, arranged to display the preview image;
an input device, arranged to receive at least one first selection signal and at least one second selection signal, wherein the first selection signal corresponds to a first area in the preview image, and the second selection signal corresponds to a second area in the preview image, and the input device is a touch module implemented in the display device; and
a processing unit, arranged to calculate a light-metering value according to the first selection signal and the second selection signal, and enable the image-capture module to capture an image according to the light-metering value, wherein the processing unit further comprises:
a first calculation module, arranged to calculate a first light-metering sub-value of the first area and a second light-metering sub-value of the second area;
a second calculation module, arranged to produce the light-metering value by respectively weighting the first light-metering sub-value and the second light-metering sub-value according to a first weight value and a second weight value; and
a determination module, arranged to determine the first weight value and the second weight value according to a number of times the first selection signal is received by the touch module and a number of times the second selection signal is received by the touch module, respectively.

4. The image-capture device as claimed in claim 1, wherein the input device has a plurality of buttons.

5. The image-capture device as claimed in claim 4, wherein the processing unit further comprises a determination module arranged to determine the first weight value and the second weight value according to the period of the first selection signal and the period of the second selection signal, respectively.

6. The image-capture device as claimed in claim 3, wherein the processing unit further comprises a determination module arranged to determine the first weight value and the second weight value according to the number of times the first selection signal is received by the buttons and the number of times the second selection signal is received by the buttons, respectively.

7. An image-capture method, comprising:
capturing a preview image;
displaying the preview image;
receiving at least one first selection signal and at least one second selection signal, wherein the first selection signal corresponds to a first area in the preview image, and the second selection signal corresponds to a second area in the preview image;
determining a first weight value of the first selection signal and a second weight value of the second selection signal according to a period of the first selection signal and a period of the second selection signal, respectively;
calculating a first light-metering sub-value of the first area and a second light-metering sub-value of the second area according to the first selection signal and the second selection signal, and producing a light-metering value by respectively weighting the first light-metering sub-value and the second light-metering sub-value according to the first weight value and the second weight value to produce the light-metering value; and
capturing an image according to the light-metering value.

8. An image-capture method, comprising:
capturing a preview image;
displaying the preview image;
receiving at least one first selection signal and at least one second selection signal, wherein the first selection signal corresponds to a first area in the preview image, and the second selection signal corresponds to a second area in the preview image;
determining a first weight value of the first selection signal and a second weight value of the second selection signal according to a number of times the first selection signal is received and a number of times the second selection signal is received, respectively;
calculating a first light-metering sub-value of the first area and a second light-metering sub-value of the second area according to the first selection signal and the second selection signal, respectively, and producing a light-metering value by respectively weighting the first light-metering sub-value and the second light-metering sub-value according to the first weight value and the second weight value to produce the light-metering value; and
capturing an image according to the light-metering value.

\* \* \* \* \*